United States Patent
Bernler et al.

(10) Patent No.: US 7,225,612 B2
(45) Date of Patent: Jun. 5, 2007

(54) METHOD AND APPARATUS FOR CONVERSION OF $NO_x$

(75) Inventors: Hans Bernler, Göteborg (SE); Roger Tengblad, Göteborg (SE); Filip Acke, Göteborg (SE); Gisela Blomkvist, Göteborg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 11/211,770

(22) Filed: Aug. 25, 2005

(65) Prior Publication Data

US 2006/0107657 A1  May 25, 2006

(51) Int. Cl.
*F01N 3/00* (2006.01)
(52) U.S. Cl. .............. 60/295; 60/274; 60/276; 60/285; 60/297; 60/301
(58) Field of Classification Search ............. 60/274, 60/276, 285, 286, 295, 297, 298, 301, 303
See application file for complete search history.

(56) References Cited

U.S. PATENT DOCUMENTS

| | | | |
|---|---|---|---|
| 5,996,338 A * | 12/1999 | Hirota | 60/285 |
| 6,336,320 B1 | 1/2002 | Tanaka et al. | |
| 6,397,582 B1 * | 6/2002 | Hanaoka et al. | 60/274 |
| 6,477,834 B1 * | 11/2002 | Asanuma et al. | 60/295 |
| 6,594,989 B1 * | 7/2003 | Hepburn et al. | 60/286 |
| 6,729,125 B2 * | 5/2004 | Suga et al. | 60/285 |
| 7,047,932 B2 * | 5/2006 | Surnilla et al. | 123/198 F |

FOREIGN PATENT DOCUMENTS

| | | |
|---|---|---|
| EP | 0869267 | 9/2003 |
| EP | 1380731 | 3/2005 |

* cited by examiner

*Primary Examiner*—Binh Q. Tran
(74) *Attorney, Agent, or Firm*—Julia Voutyras; Allan Lippa

(57) ABSTRACT

The invention refers to a method and apparatus for converting $NO_x$ and comprises the step of controlling a temperature in a $NO_x$-LNT by adsorbing $NO_x$ in the LNT at a temperature below a predetermined temperature value to a predetermined value being the maximum amount of $NO_x$ to be stored at the predetermined temperature value, thereafter heating the LNT to the predetermined temperature value, and thereafter starting a regeneration process by addition of reducing agents.

12 Claims, 2 Drawing Sheets

METHOD AND APPARATUS FOR CONVERSION OF $NO_x$

FIELD OF INVENTION

The invention relates to a method and a system for converting $NO_x$ in an internal combustion engine exhaust gas. The method comprises the step of controlling a temperature in an LNT.

BACKGROUND OF THE INVENTION

In the field of lean-burn internal combustion engines, reduction of $NO_x$, such as NO and $NO_2$, in exhaust gas is a well known problem. It is known to use so called Lean $NO_x$ Traps (LNTs) in the exhaust system for adsorbing $NO_x$ when the engine is run lean and to convert $NO_x$ into $N_2$ (Nitrogen gas) during a regeneration period when the engine is run rich. Here lean refers to an air-fuel ratio above lambda equal to 1, i.e. the stoichometric air-fuel ratio, where the production of HC (hydrocarbons) and CO (carbon oxides) are low and where the production of $NO_x$ is high. Rich refers to a value below the lambda equal to 1 and where the production of HC and CO is high and where the production of $NO_x$ is relatively low. However, $NO_x$ does not have to be low at this running mode, but the oxygen $O_2$ level always is. The hydrocarbons and carbon dioxides are reductants in the regeneration process. Reductants may also be called reducing agents or reducing compounds. An additional example of a reductant is hydrogen gas $H_2$.

When the engine is run rich the excess amount of reductants reacts with the adsorbed $NO_x$ and forms $N_2$. The engine is then run lean again and $NO_x$ is again adsorbed until the engine is run rich.

The optimum NOx conversion temperature value in the LNT is dependent, for example, on such factors as which fuel is used, how the LNT is constructed and the materials used, the age of the LNT, etc. However, the optimum NOx conversion temperature value is chosen in a temperature region where optimum conversion of $NO_x$ into $N_2$ is possible. The temperature of the LNT is dependent on the temperature of the exhaust gas which becomes higher when the number of revolutions in the engine increases and/or when the load on the engine becomes higher and/or when the engine is run rich.

One problem with prior art occurs when the engine is run at conditions where the temperature of the LNT is well below the optimum NOx conversion temperature. At this low temperature the conversion of $NO_x$ is low, but it is known one scenario where to start regenerate at the low temperature by running the engine rich and continue running rich until the temperature has increased to the temperature close to or on the optimum temperature for regeneration. One problem with the latter solution is that the $NO_x$ conversion is low per se at this temperature and the process is thus a waste of fuel. Another problem is that $NO_x$ adsorbs well at low temperatures and desorbs with increased temperatures, why the procedure would yield an amount of desorbed $NO_x$ that cannot be converted and thus will escape to the environment with the exhaust gas.

Another known scenario is to wait for the engine to produce exhaust gas with temperatures high enough to heat up the LNT to the optimum NOx conversion temperature. However, as described above, the $NO_x$ adsorbs well at low temperatures and desorbs with increased temperatures, why this procedure would yield an amount of desorbed $NO_x$ that cannot be converted at the optimum NOx conversion temperature and thus will escape to the environment with the exhaust gas.

Therefore, there is a need for an improved method and apparatus for $NO_x$ conversion when the engine is run at conditions where the LNT temperature is well below the optimum NOx conversion temperature.

SUMMARY OF INVENTION

The foregoing problems and disadvantages are overcome by a method and system in accordance with the present invention.

According to the present invention, method for converting $NO_x$ in an internal combustion engine exhaust, the engine having a Lean NOx Trap (LNT) coupled downstream of it, includes: adsorbing $NO_x$ from the exhaust gas in the LNT at a temperature of the LNT below a predetermined temperature to a predetermined adsorption amount being the maximum amount of $NO_x$ to be adsorbed in the LNT at said predetermined temperature, and subsequently heating the LNT to said predetermined temperature, and regenerating the LNT.

In another embodiment of the present invention, the predetermined temperature is an LNT temperature where the conversion of $NO_x$ is optimum.

In other words, according to the present invention, the method teaches controlling a temperature in an LNT such that when $NO_x$ have been adsorbed in the LNT to the predetermined adsorption value being the maximum amount of $NO_x$ to be stored at the prdetermined temperature, the LNT is heated to the optimum NOx conversion temperature of the LNT whereafter the LNT is regenerated.

An advantage of the present invention is that $NO_x$ is adsorbed in the LNT in an optimum amount at lower temperatures, i.e. temperatures below the predetermined temperature, and little or no $NO_x$ will desorb during the increase from the low temperature to the predetermined temperature. This means that even though the engine is run during conditions generating less heat than necessary in order to heat the LNT to the predetermined temperature there is an optimum conversion of $NO_x$ at the conditions prevailing since no or little $NO_x$ of the adsorbed $NO_x$ desorbs during the heating up phase but is converted at the predetermined temperature.

The predetermined temperature value is preferably a temperature value of the LNT where the conversion of $NO_x$ is optimum. The optimum conversion is dependent on a number of factors and is known to the skilled person. Some of the factors have been descried above in connection to the description of prior art. The predetermined temperature value may also be a different value suitable for the current situation. For example, a different predetermined temperature may be used, higher or lower than the optimum temperature value, dependent on other factors than the optimum conversion, for example fuel consumption.

The LNT may be heated to the predetermined temperature by changing the running conditions on the engine without running the engine rich enough to start a regeneration process. Here regeneration refers to the conversion of $NO_x$ by addition of reductants. The reducing agents preferably comprise hydrocarbons or carbon oxides, but may also comprise another suitable reducing agent, for example hydrogen gas. The running conditions may be changed by an increased number of revolutions and/or by changing the timing of ignition and/or changing the air/fuel ratio. However, the latter case is with the above restrictions. Further examples are throttling or the closing of vains on turbines, or raising the back pressure. The LNT may also be heated by electric means and/or by use of a heat exchanger for example by leading hot air from a position upstream the exhaust pipe system, for example at a position close to the cylinders, via an insulated conductor to the LNT. Any other suitable means for heating the LNT at the right moment may also be contemplated.

According to the invention $NO_x$ is stored at a temperature below the predetermined temperature and during conditions where the engine is run at lean conditions. The regeneration process starts when the engine is shifted from running during lean conditions to running during rich condition. As stated before lean refers to a value above a stoichometric air-fuel ratio and rich refers to a value below the stoichometric air-fuel ratio.

The regeneration, i.e. the rich running condition, proceeds during a predetermined time period, preferably in the range 2-15 second, until all or the main part of the adsorbed $NO_x$ have been converted. The engine is then shifted back to normal running conditions prevailing at that point in time. These normal running conditions may be the same conditions as before the heating process started or another condition dependent on, for example, the driver and/or the terrain. However, after regeneration the engine is normally changed back to running during lean conditions until the next predetermined value for stored $NO_x$ is reached.

According to one embodiment, the addition of reducing agents is done by running the engine rich. According to another embodiment the addition of reducing agents is done by injection of the reducing agent into the exhaust gas, upstream the LNT. A combination of the two enhancing methods is also possible. The reducing agents are preferably hydrocarbons.

The engine is preferably a Diesel engine which is preferably run on diesel.

As stated above, the heating of the LNT starts when $NO_x$ have been adsorbed in the LNT to the predetermined adsorption value being the maximum amount of $NO_x$ to be stored at a predetermined temperature of the LNT. The absorbed amount of $NO_x$ may be estimated by mapping the amount of $NO_x$ out from the engine and to have a counter within the LNT that is constructed to keep track on adsorbed $NO_x$ as a function of aging, sulpher poisoning, temperature, engine out $NO_x$, space velocity, etc. Another possibility could be to use a $NO_x$ sensor before and after the LNT.

BRIEF DESCRIPTION OF DRAWINGS

The invention will below be explained in further details in connection to a number of figures, where.

DESCRIPTION OF PREFERRED EMBODIMENT(S)

Figure 1:
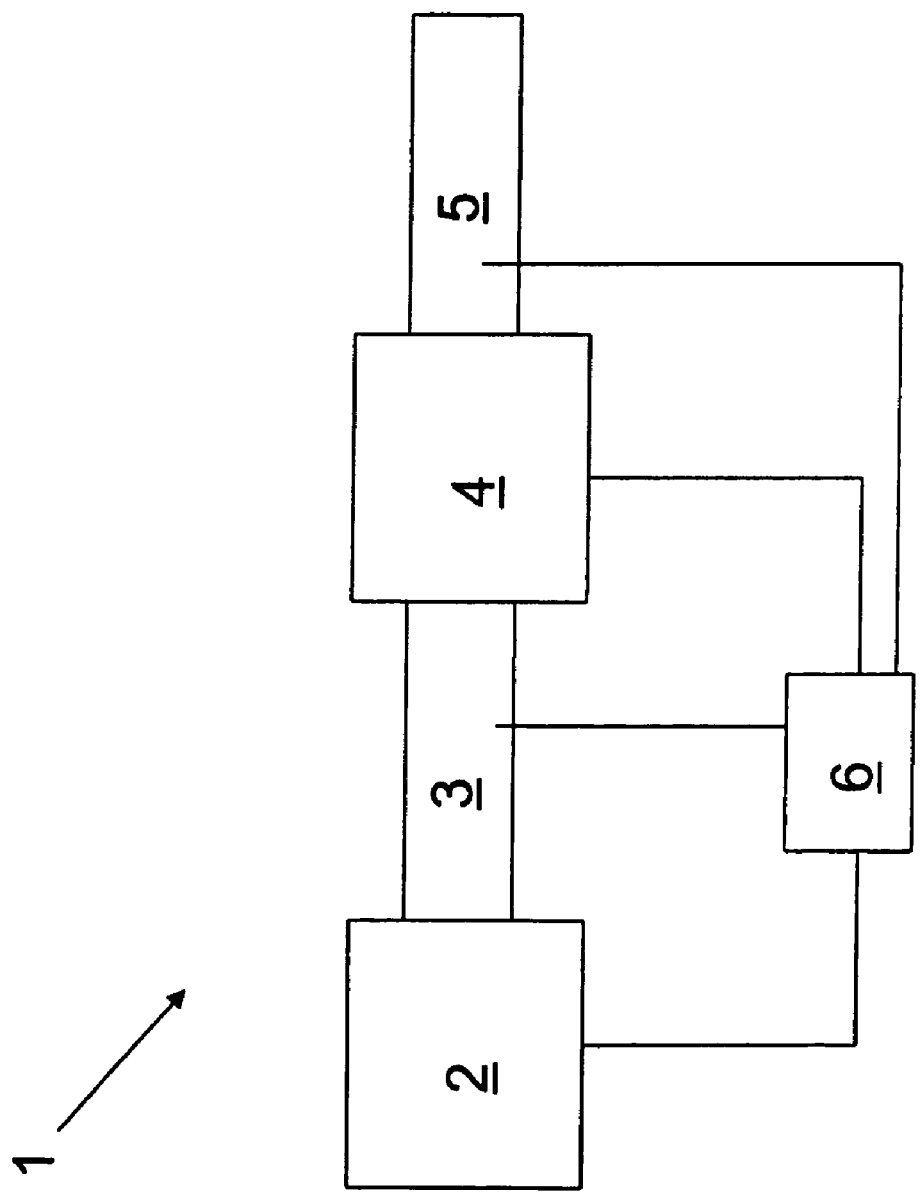
FIG. 1 schematically shows an internal combustion engine system wherein the invention is utilized to advantage.

FIG. 1 schematically shows a combustion system 1 comprising an engine 2; a first exhaust pipe 3 coupled to the engine; a Lean NOx Trap (LNT) 4 coupled to the first exhaust pipe; a second exhaust pipe 5 coupled to the LNT. A second LNT may be coupled to the second exhaust pipe and a third exhaust pipe will then be coupled to the second LNT. When the engine is running exhaust gas is conducted via the exhaust pipes and the LNT to the ambient air.

FIG. 1 also shows a controller 6 arranged for converting $NO_x$ in the LNT. The LNT 4 is in fluid communication with the engine 2 via the first exhaust pipe 3. The engine 2 produces exhaust gas and the LNT 4 is arranged to adsorb $NO_x$ from the exhaust gas at any temperature value below a predetermined temperature to a predetermined adsorption value being the maximum amount of $NO_x$ to be stored at the predetermined temperature. The controler 6 is arranged to control the temperature in the LNT 4 such that when the predetermined value for $NO_x$-adsorption is reached, the controller 6 controls a heating device (not shown) arranged to heat the LNT to the predetermined temperature. When the predetermined temperature is reached, the controller is arranged to start a regeneration process by, for example, addition of reducing agents.

FIG. 1 shows that the controller 6 is coupled/connected to the engine 2, the LNT 4 and to a position in the first exhaust pipe 2 and to a position in the second exhaust pipe 5. The couplings/connections are intended to show that the controller 6 gets input parameters from all or some of the parts in the combustion system 1 and that the controller 6 may affect all or some parts in the combustion system 1 by output parameters, depending on the input parameters.

The input parameters may be engine rpm, and/or torque, and/or load, and/or the amount of $NO_x$ in the exhaust gas both before and after the LNT 4, and/or the temperature in the LNT, and/or the amount of $NO_x$ adsorbed in the LNT, and/or any other suitable parameter necessary for the control of the $NO_x$-conversion.

The input parameters may be engine rpm, and/or air to fuel ratio, and/or torque, and/or load, and/or the amount of $NO_x$ in the exhaust gas both before and after the LNT 4, and/or the temperature in the LNT, and/or the amount of $NO_x$ adsorbed in the LNT, and/or any other suitable parameter necessary for the control of the $NO_x$-conversion.

The output parameters may be a parameter changing the conditions in the system, for example the engine rpm, and/or air to fuel ratio, and/or torque, and/or load, and/or the temperature in the LNT, and/or injection of a reducing agent upstream the LNT, and/or any other suitable parameter necessary for heating the LNT to the predetermine temperature and to thereafter start the regeneration.

Figure 2:
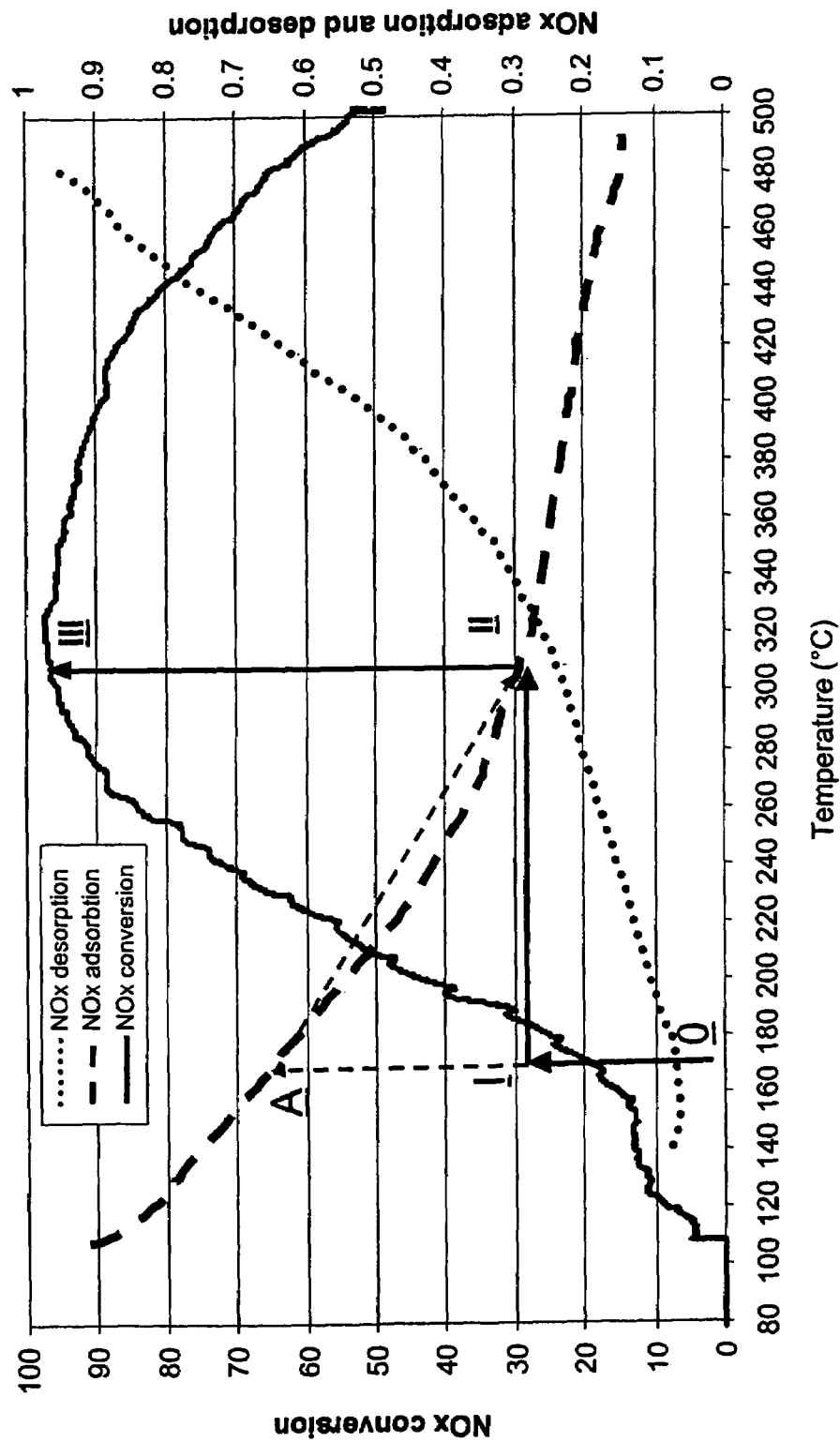
FIG. 2 schematically shows diagrams of $NO_x$-conversion, $NO_x$-desorption, and NOx adsorption of LNT versus LNT temperature.

FIG. 2 schematically shows a $NO_x$-conversion diagram for an LNT 4 according to FIG. 1. The diagram may also be a diagram for the second LNT (not shown). FIG. 1 shows $NO_x$-conversion Vs LNT temperature with a continuous line; $NO_x$-adsorption Vs LNT temperature with a dashed line; and $NO_x$-desorption Vs LNT temperature with a dotted line. FIG. 1 also shows continuous arrows marking the inventive conversion path and dashed arrows marking prior art conversion path. The temperature refers to the temperature in the LNT 4. The $NO_x$-conversion diagram changes due to a number of factors, for example, aging and choice of catalytic material, which is well known in prior art. The diagram is only one example, and the diagram will be different dependent on the previously described parameters, for example the materials used in the LNT and the aging, etc.

The inventive method comprises the step of controlling the temperature in the LNT 4 in dependence on the $NO_x$-conversion diagram valid at the present point in time.

In FIG. 2 the predetermined temperature corresponds to a temperature value in point II and point III in the diagram. Point III refers to the maximum $NO_x$-conversion possible for the specific LNT and point II refers to the maximum amount of $NO_x$ that can be adsorbed/stored in the LNT at the predetermined temperature. The predetermined temperature thus refers to the temperature where the conversion of $NO_x$ is optimum, i.e. at its maximum level.

The arrow going from point 0 to point 1 refers to the $NO_x$ being adsorbed in the LNT 4 to the predetermined value of $NO_x$ adsorption being the maximum amount of $NO_x$ to be stored at the predetermined temperature value. The dashed arrow going from point I to point A refers to a possible amount of $NO_x$ to be adsorbed at the present temperature. As can be seen in FIG. 2, point I and point A refers to a lower temperature value than point II and point III. The LNT 4 may adsorb more $NO_x$ at low temperature than at a high temperature, at least until the temperature has reached the temperature in point III whereafter the $NO_x$ adsorption decreases with increased temperature.

The invention refers to a method where the LNT 4 is heated from the temperature value in point I to the predetermined temperature in point 11, when the adsorption of $NO_x$ has reached point I, i.e. has reached the predetermined and maximum value for adsorbed $NO_x$ in point II. When the LNT 4 has reached the predetermined temperature value in point II, a regeneration process starts by addition of reducing agents as described in prior art.

Should the LNT 4 not have been heated in point 1, i.e. when the adsorbed $NO_x$ in point I has reached the predetermined value, the $NO_x$ would have been further adsorbed at the temperature in point I to the amount referred to in point A. When the LNT 4 then would have been heated, for example when the load on the engine is increased and/or when the number of revolutions is increased, etc., the excess amount of $NO_x$ would have been desorbed during the increase from the low temperature of the LNT in point I to the predetermined temperature of the LNT in point II. This is shown by a dashed arrow going form point A to point II, and is also shown by the dotted line going from a point above point O to a point close to point II. It should be noted that the desorption of $NO_x$ is something that shall be avoided because the desorbed $NO_x$ is propelled to the ambient air with the exhaust and will not take part in the conversion to the more desirable product $N_2$, why the overall conversion of $NO_x$ will be decreased.

This concludes the description of the invention. The reading of it by those skilled in the art would bring to mind many alterations and modifications without departing from the spirit and the scope of the invention. Accordingly, it is intended that the scope of the invention be defined by the following claims:

The invention claimed is:

1. A method for converting NOx in an internal combustion engine exhaust, the engine having a Lean NOx Trap (LNT) coupled downstream of it, the method comprising:
adsorbing NOx from the exhaust gas in the LNT at a temperature of the LNT below a predetermined temperature to a predetermined adsorption amount being the maximum amount of $NO_x$ to be adsorbed in the LNT at said predetermined temperature, and subsequently heating the LNT to said predetermined temperature, and regenerating the LNT.

2. The method according to claim 1 wherein regenerating the LNT comprises converting said adsorbed $NO_x$ to $N_2$.

3. The method according to claim 2, wherein said predetermined temperature is an LNT temperature where the conversion of $NO_x$ is optimum.

4. The method according to claim 3, wherein $NO_x$ is adsorbed at a temperature below said predetermined temperature and during conditions where the engine is run at lean conditions.

5. The method according to claim 4, wherein heating the LNT to said predetermined temperature comprises changing the running conditions of the engine without running the engine rich enough to start the regeneration process.

6. The method according to claim 4, wherein heating the LNT to said predetermined temperature comprises heating it by electric means.

7. The method according to claim 4, wherein heating the LNT to said predetermined temperature comprises using a heat exchanger.

8. The method according to claim 4, wherein the LNT is regenerated by running the engine rich.

9. The method according to claim 8, wherein the regeneration process proceeds for a predetermined time period until substantially all of the adsorbed $NO_x$ has been converted, whereafter the engine is shifted back to running lean.

10. The method according to claim 9, wherein the engine is a diesel engine.

11. A system for converting $NO_x$ in an internal combustion engine exhaust gas, comprising:
an LNT coupled downstream of the engine; and
a controller arranged to control a temperature of said LNT such that when the LNT has adsorbed $NO_x$ from the exhaust gas at a temperature below a predetermined temperature to a predetermined value being the maximum amount of $NO_x$ to be stored in said LNT at said predetermined temperature, said controller heats the LNT to said predetermined temperature and adjusts operating conditions to regenerate said LNT.

12. A method for reducing NOx generated by lean-burn internal combustion engine, the engine having an LNT coupled downstream of it, the method comprising:
operating the engine lean when the LNT temperature is below a predetermined temperature until a predetermined amount of NOx is stored in the LNT, said predetermined amount of $NO_x$ being the maximum amount of NOx that can be stored in the LNT when the LNT temperature is at said predetermined temperature; and
subsequently increasing the LNT temperature to said predetermined temperature and regenerating the LNT.

* * * * *